J. D. LOVE.
BRACE FOR CROSS ARMS.
APPLICATION FILED JUNE 11, 1909.

958,933.

Patented May 24, 1910.

ATTEST.
Bent M. Stahl
Edward N. Sarton

INVENTOR.
J. D. Love.
By Spear Middleton Donaldson Spear
ATT'Y's

UNITED STATES PATENT OFFICE.

JOHN DUNLAP LOVE, OF ATHENS, OHIO.

BRACE FOR CROSS-ARMS.

958,933.  Specification of Letters Patent.  Patented May 24, 1910.

Application filed June 11, 1909. Serial No. 501,547.

*To all whom it may concern:*

Be it known that I, JOHN D. LOVE, citizen of the United States, residing at Athens, Ohio, have invented certain new and useful Improvements in Braces for Cross-Arms, of which the following is a specification.

My invention relates to improvements in braces for holding in parallel position such parts as the double cross arms of wood or metal poles which carry electric wires or cables, and the invention includes the novel features of construction and combination and arrangement of parts hereinafter described and particularly set forth in the appended claims.

The invention is illustrated in the accompanying drawings, in which—

Figure 1:
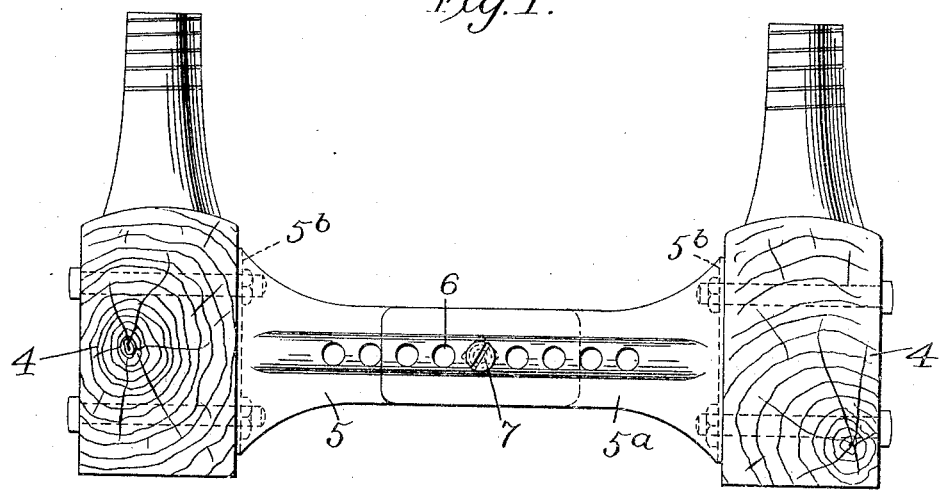
Figure 2:
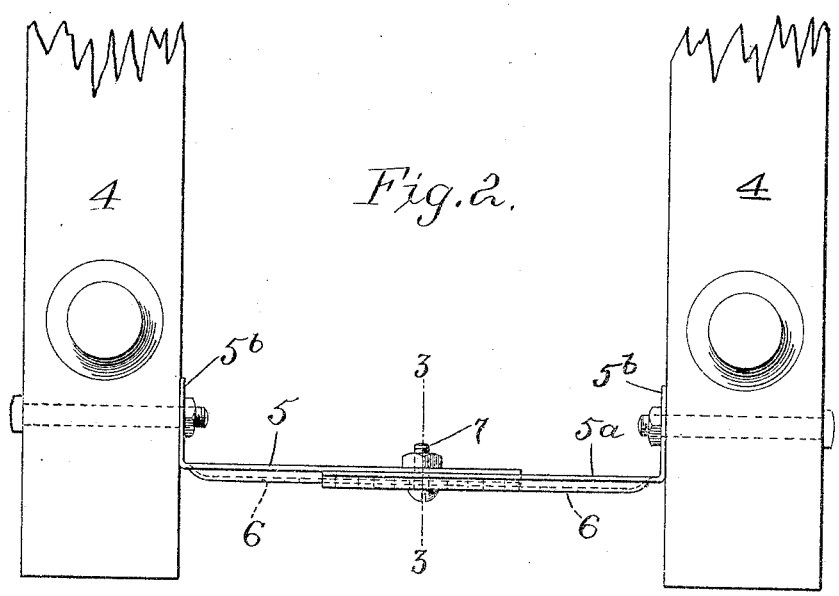
Figure 3:
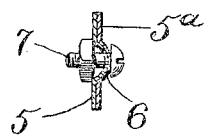

Figure 1 is an end view of a pair of cross arms with the bracing device between; Fig. 2 is a view of the bracing device at right angles to Fig. 1; Fig. 3 is a section on line 3—3 of Fig. 2.

Referring by reference characters to these drawings, the numerals 4 designate the wood or metal cross arms, and 5 and 5ª the two parts of the bracing device, which are duplicates of each other. These are preferably formed of sheet metal of suitable weight to provide the requisite strength, and each of them has an angularly turned flange portion 5ᵇ provided with holes by which it may be bolted to the adjacent cross arm. The body portions of the brace members are designed to overlap as shown, and are provided with a plurality of longitudinal holes 6 through which one or more bolts 7 may be passed for securing the overlapping parts rigidly together. The plurality of holes provides means by which the overlapping parts may be adjusted longitudinally with relation to each other. I prefer to corrugate the overlapping parts to secure additional strength, the corrugations and the two parts being coincident so as to fit the one within the other. Preferably these corrugations are formed in the shape of semicircular channels extending along the line of the openings as shown.

Having thus described my invention, what I claim is:—

1. A bracing device for cross arms and the like, comprising two overlapping grooved members provided with a plurality of openings, one or more bolts passing through the openings for locking the parts together and having angularly turned ends, and means for securing the ends of said members to the cross arms, substantially as described.

2. A bracing device for cross arms and the like, comprising two overlapping sheet metal members having alining depressed, central portions, and plain side bearing portions, said central portions having a plurality of openings, a bolt passing through alining openings, said members having widened and angularly turned ends with means for attaching them to the cross arms, substantially as described.

In testimony whereof, I affix my signature in presence of two witnesses.

JOHN DUNLAP LOVE.

Witnesses:
W. B. DAILEY,
D. SCOTT ALLEN.